July 12, 1960 C. E. GYGER ET AL 2,945,216

INTERNAL SHIELD FOR ELECTROMAGNETIC HEAD

Filed Jan. 13, 1958

ALFRED D. SCARBROUGH
CECIL E. GYGER
INVENTOR.

BY Morris Spector
Arthur Decker
ATTORNEYS.

1

2,945,216

INTERNAL SHIELD FOR ELECTROMAGNETIC HEAD

Cecil E. Gyger, Littleton, Colo., and Alfred D. Scarbrough, Palos Verdes Estates, Calif., assignors, by mesne assignments, to Thompson Ramo Wooldridge Inc., Cleveland, Ohio, a corporation of Ohio Filed Jan. 13, 1958, Ser. No. 708,519

14 Claims. (Cl. 340—174)

This invention relates to magnetic recording and reproducing heads for use with magnetic drum digital computers and more particularly to a shielding arrangement employed to magnetically isolate, for instance, the recording and sensing portions of a dual magnetic head associated with a drum recirculating register.

In the recirculating register associated with the drum of a digital computer, the usual method and equipment used for detecting the magnetic binaries that are recorded on the sensitive surface of the drum is an electromagnetic transducing head of the type employed for recording the binaries.

For purposes of economy and simplicity, it is advantageous to include the recording head and the sensing head within the same housing, and this is feasible in view of the availability of miniaturized electromagnetic heads such as is described in a copending application for patent, Serial Number 660,138, filed May 20, 1957. The dual head construction provides a separation between the recording and sensing air gaps corresponding to the track length to be used as part of the recirculating register. In the case of a one-word recirculating register, this separation is on the order of 0.2 inch. As a consequence, the spacial separation between the pole pieces or sensing coils or other corresponding structure of the recording and sensing heads is quite small. Such close spacing produces a variety of undesirable effects.

Recording and sensing heads currently in use in connection with magnetic recording apparatus have been found to be particularly sensitive to stray magnetic fields originating externally thereof. It is not always possible, particularly in miniaturized apparatus, to so position or shield power circuits that the stray magnetic fields arising therefrom have an inappreciable effect upon the sensing head. Such stray fields, if not made ineffectual, cause an undesired spurious signal to be sensed.

Additionally, if, in a dual recording and sensing head there is some leakage flux, there are usually established external fields during the recording operation. Such external fields are undesirable, since they interfere with the efficiency of the sensing head operating in close proximity thereto, in that the sensing head will sense the magnetic field being generated by the recording head at the same time that it senses the magnetic binaries recorded on the drum. Thus, it is quite possible that the voltage induced in the coil of the sensing head as a result of the former may completely mask that induced as a result of the latter. At the least, this effect places severe design requirements on the amplifying apparatus associated with the sensing head.

The coupling between the recording head and the sensing head in the dual electromagnetic head is apparently caused by undesirable magnetic fields generated as a function of the inherent construction of closely associated heads utilized for simultaneous magnetic recording and sensing. Independent shielding of the cores has been found not to adequately reduce this coupling.

2

It is thus an object of this invention to provide means for making the magnetically sensitive elements of a dual recording and sensing head substantially insensitive to magnetic fields originating externally of the head.

It is also an object of this invention to accomplish the foregoing without reducing the sensitivity of the head to local fields associated with the magnetic recording medium passing adjacent thereto.

It is a further object of this invention to provide new and improved means for confining the establishment of appreciable external fields by a magnetic recording head, these fields being manifested as induced voltages (crosstalk) in a sensing head positioned in the vicinity.

Another object of the present invention is to provide a novel magnetic circuit for an electromagnetic transducer, one which provides complete magnetic shielding without materially reducing the ease of assembly or simplicity of construction of the head.

One of the principal features and objects, however, is to provide a novel internal shielding arrangement for an electromagnetic transducer head, said shielding arrangement being adjustable for optimum shielding effect.

The features of the invention which are believed to be novel and patentable are specified in the appended claims. The invention, however, together with further objects and advantages thereof, may best be understood by reference to the following description of the accompanying drawings, in which:

Figures 1, 2, 3:
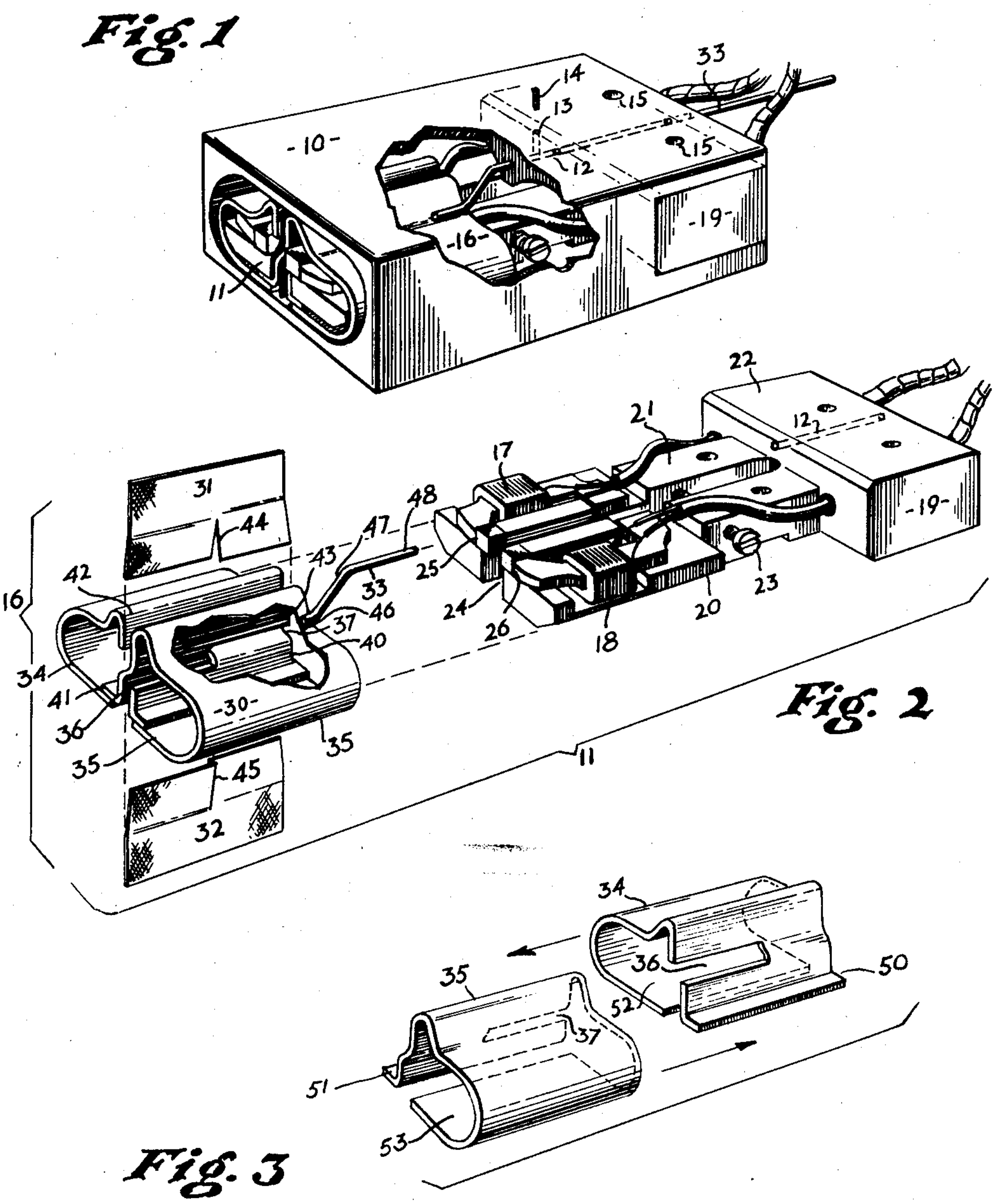
Figure 1 shows a dual electromagnetic head for use in a one-word recirculating register of a drum computer, part of the casing of the head being broken away and the filler material not being shown in order to better show the internal assembly.
Figure 2 is an exploded view of the internal assembly of the head of Figure 1.
Figure 3 shows the shield of the present invention in its two component parts before soldering.

Although, for convenience, the present invention will be shown and described with reference to a dual electromagnetic head utilized for recording and sensing in association with a recirculating register of a computer storage drum, it is to be understood that no limitation in this respect is implied, since the invention may find application otherwise, as, for instance, in a multiple head used in the art of tape recording.

Referring now to Figure 1, here is shown a dual electromagnetic head with part of its casing broken away to show internal construction. The dual head is seen to comprise casing 10 made of conductive material and internal assembly 11. It will be understood that filler material, such as silicone rubber, is inserted in the interior of the head after assembly, to provide relative rigidity and substantial electrical isolation between casing 10 and internal assembly 11, although this material is not shown. Casing 10 is provided with a hole 12, extending from the lateral center at the rear to a region approximately half the length thereof. The purpose of hole 12 is to accommodate bar 33 of shield assembly 16, which, during assembly, is fitted through hole 12 and firmly anchored to casing 10 by means of a set screw 14 in hole 13. Thus is provided but one firm electrical contact between shield assembly 16 and casing 10. Also provided in casing 10 are holes 15, which accommodate set screws (not shown) for fastening to plate 19 of internal assembly 11.

Figure 2 presents internal assembly 11 of the dual head with shield assembly 16 removed. The resemblance of recording and sensing heads, 17 and 18, respectively, to that described in the referenced application for patent, Serial Number 660,138, is apparent.

It is convenient to regard head 17 as utilized for recording and to regard head 18 as utilized for sensing, in association with a magnetically sensitized surface such as the storage drum of a computer. However, since heads 17 and 18 may feasibly be identical, this utilization is to be taken, not as restrictive, but as exemplary. Heads 17 and 18 are fixedly mounted on plate 19 which comprises a forward section 20 shaped to conform with the configuration of heads 17 and 18, an adjustment section 21 and a base section 22.

As shown, each of the sections 20 and 21 is divided by a channel 24, which can be varied in width by rotating screw 23 which is threaded through one portion of adjustment section 21 and presses against the other portion thereof. It is evident that variation in screw 23 causes variation in the separation of air gaps 25 and 26 of heads 17 and 18, respectively. It is in this way that the dual head is adjusted to provide a one-word length of the recirculating register.

Shield assembly 16 comprises shield 30, insulators 31 and 32, and bar 33. Dimensionally, shield 30 is constructed to surround heads 17 and 18 and forward section 20 of plate 19, and is made of a highly conductive material such as silver foil 0.01 inch thick. In configuration, shield 16 approximately resembles a figure "8," one loop or cylinder of the "8" capable of surrounding a head and its supporting half of forward section 20. Thus, cylinder 34 is capable of surrounding head 17 and its support, and cylinder 35 is capable of surrounding head 18 and its support. Continuity of material is provided between cylinders 34 and 35 by including a pair of facing slits 36 and 37, slit 36 commencing at the end of cylinder 34 and extending to the approximate longitudinal center thereof, and slit 37 commencing at the end of cylinder 35 and extending to the approximate longitudinal center thereof, and assembling shield 30 such that a portion 40 of the wall of cylinder 34 passes through slit 37 and a portion 41 of the wall of cylinder 35 passes through slit 36.

Means to electrically insulate between cylinders 34 and 35 to prevent contact between flattened end 42 of cylinder 34 and wall 41 of cylinder 35 and between flattened end 43 of cylinder 35 and wall 40 of cylinder 34 is provided in the form of thin sheet insulators 31 and 32, respectively. Insulators 31 and 32 are each of length substantially the same as that of cylinders 34 and 35, and have slits 44 and 45, respectively, for forming a pair of legs in each. Slits 44 and 45 are located in the approximate centers of the lengths of insulators 31 and 32, and extend from the respective edges to the approximate centers of the respective widths. In the complete shield assembly 16, insulators 31 and 32 are inserted between cylinders 34 and 35 from opposite sides, one leg of each insulator extending through one of the slits 36 and 37 in shield 30, thereby being positioned between the walls of cylinders 34 and 35 in the area adjacent slits 36 and 37.

It has been found, with respect to an assembled dual electromagnetic head, that the position of shield assembly 16, with relation to recording and sensing heads 17 and 18, affects considerably the amount of cross-talk and pick up from external fields. For this reason, shield assembly 16 includes bar 33 as means of adjusting its position for minimum spurious voltage output from sensing head 18 during an operative run of the dual head in cooperation with the revolving drum of a computer. Bar 33 is soldered to shield 30 at end 46 and has a bent portion 47 attached to a rod 48. In assembly of the dual head, rod 48 is passed through hole 12 in casing 10 (Figure 1) and base section 22 of plate 19, and, after the aforementioned adjustment along the longitudinal axis of the dual head, is firmly anchored to casing 10 by means of set screw 14 in hole 13 (Figure 1). The end of rod 48 protruding from the base of the dual head is then snipped off close to the base.

Shield 30 may be conveniently constructed if the two cylinders 34 and 35 are individually fabricated since, as is shown in Figure 3, they are identical. Shield 30 is assembled by cross-joining through slits 36 and 37 such that shoulder 50 of cylinder 34 rests on wall 53 of cylinder 35 and shoulder 51 of cylinder 35 rests on wall 52 of cylinder 34. Solder is then used to seal the joints between shoulder 50 and wall 53 and between shoulder 51 and wall 52.

It will be appreciated by those skilled in the art that the novel internal shielding arrangement for a dual electromagnetic head as described above operates as a single turn around heads 17 and 18 (Figure 1) which reverses the polarity of magnetic coupling to effectuate cancellation thereof. In the present construction, recording lines of force are utilized to produce a circulating current in a clockwise direction in cylinder 34 of shield 30. This current flows into cylinder 35, thereby generating lines of force opposite in direction to those entering via air gap 26 of sensing head 18. As a result, simultaneous and oppositely polarized voltages are induced in the sensing coil of head 18 by the cross-talk magnetic field and the field caused by current in cylinder 35, and, by proper adjustment of shield assembly 16, complete cancellation may be achieved. Thus, it will be appreciated that the structure provides a magnetic feedback circuit which efficiently cancels out undesired stray fields in the coil of a sensing head. It has been found that, when properly adjusted, this shielding arrangement can reduce cross-talk by as much as 40 db.

It is to be understood that the preferred embodiment of the invention is not to be considered as limitative, neither in the above description nor in the showings of the drawings, since the invention may otherwise be practiced without departing materially from the appended claims.

What is claimed is:

1. In a dual electromagnetic head of the type having similar recording and sensing heads and a conductive casing, an internal shield comprising: a first cylinder of conductive material having an inside diameter dimensioned to surround the recording head and an outside diameter dimensioned to fit within the casing; a second cylinder of conductive material having an inside diameter dimensioned to surround the sensing head and an outside diameter dimensioned to fit within the casing; and means to provide continuity of material between said cylinders.

2. The combination of claim 1; and means to adjust the position of said cylinders relative to the recording and sensing heads.

3. The combination of claim 1; and means to adjust the position of said cylinders relative to the recording and sensing heads along the longitudinal axis of the dual head.

4. The combination of claim 1, in which said means to provide continuity of material between said cylinders comprises: a pair of facing slits, one commencing at the end of said first cylinder and extending approximately half the length thereof, the other commencing at the opposite end of said second cylinder and extending approximately half the length thereof, a portion of the wall of each said cylinder passing through the slit in the other said cylinder.

5. The combination of claim 4; and means to electrically insulate between the walls of said cylinders.

6. The combination of claim 4; and means to prevent contact between the walls of said cylinders in the area adjacent said slits.

7. The combination of claim 4; and insulation means also extending through said slits and positioned between the walls of said cylinders in the area adjacent said slits.

8. The combination of claim 4; and a pair of thin sheet insulators each of length substantially equal to the length of said cylinders and having a slit for forming a pair of legs, said insulators being inserted between said cylinders from opposite sides thereof, and each of said insulators being positioned with one leg extending between each of said slits in said cylinders.

9. The combination of claim 4; and a pair of rectangular insulator foils each having a slit approximately in the center of the longitudinal dimension thereof and extending from an edge to the approximate center of the lateral dimension thereof, thereby forming a pair of legs, and each positioned with one leg extending between each of said slits in said cylinders, the legs passing through the same said slit extending therethrough in opposite directions, one on each side of said portion of the wall of said cylinder also passing through said slit.

10. In a multiple electromagnetic head of the type including a recording head, a sensing head and a conductive casing, an internal shield comprising: a pair of D-shaped hollow cylinders of conductive material, one positioned to substantially surround each head and capable of fitting within the casing, the flattened areas of said cylinders facing each other and having opposed longitudinal slits at the approximate lateral center thereof and extending from the ends of said cylinders towards the approximate longitudinal center thereof; and insulation means also extending through the slits and positioned between the flattened areas.

11. The combination of claim 10; and means to adjust the position of the internal shield relative to the recording and sensing heads along the longitudinal axis of the multiple head.

12. The combination of claim 11, in which said means to adjust the position of the internal shield comprises a wire shaft attached to the shield and extending along the length of the multiple head through the casing; and means to provide a firm contact between said wire shaft and the casing.

13. In an electromagnetic head having a plurality of aligned sensitive element portions housed in a single conductive casing, an internal shield, comprising: a cylinder of conductive material dimensioned to surround each sensitive element portions; and means to provide continuity between adjacent cylinders.

14. The combination of claim 13; and means to adjust the position of said cylinders relative to the sensitive element portions.

References Cited in the file of this patent

UNITED STATES PATENTS

| | | |
|---|---|---|
| 2,432,162 | Jones | Dec. 9, 1947 |
| 2,535,480 | Begun | Dec. 26, 1950 |
| 2,563,445 | Zenner | Aug. 7, 1951 |
| 2,769,036 | Selsted | Oct. 30, 1956 |

FOREIGN PATENTS

| | | |
|---|---|---|
| 500,988 | Canada | Mar. 23, 1954 |